J. C. MacLACHLAN.
ROTARY SPRAYING HEAD.
APPLICATION FILED OCT. 8, 1919.
1,420,722.
Patented June 27, 1922.
2 SHEETS—SHEET 1.
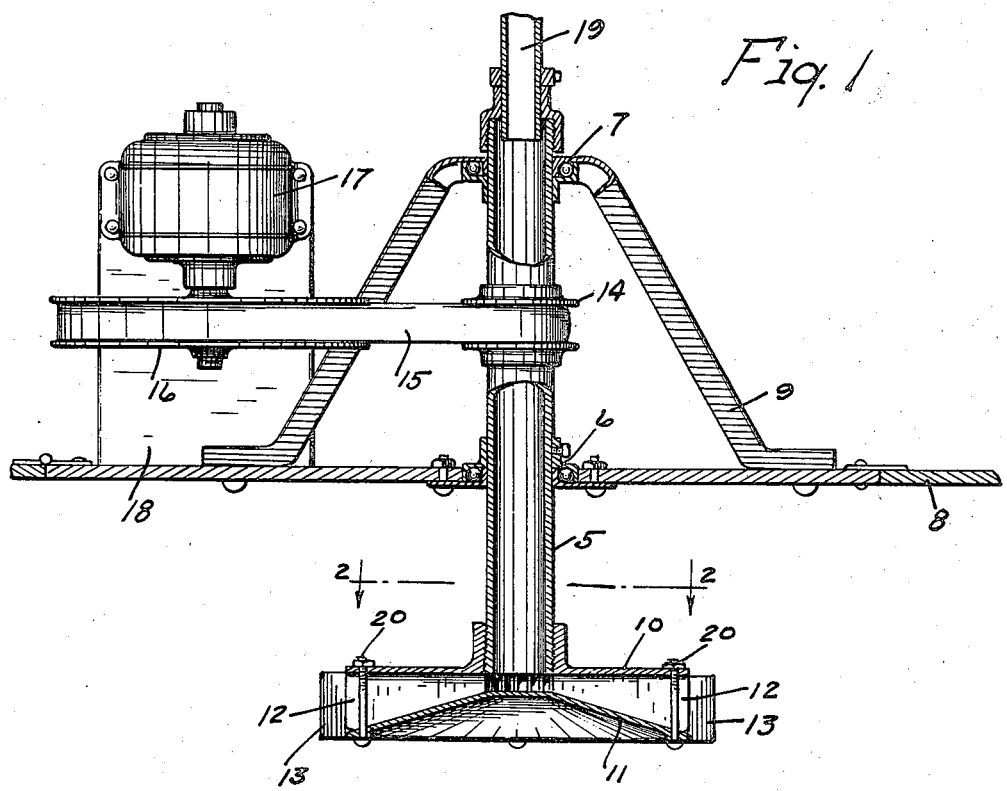
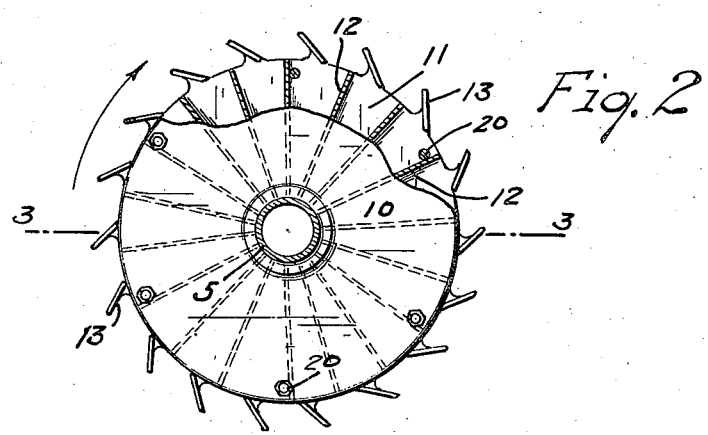
INVENTOR
John C. MacLachlan
BY HIS ATTORNEYS J. C. MacLACHLAN.
ROTARY SPRAYING HEAD.
APPLICATION FILED OCT. 8, 1919.
1,420,722.
Patented June 27, 1922.
2 SHEETS—SHEET 2.
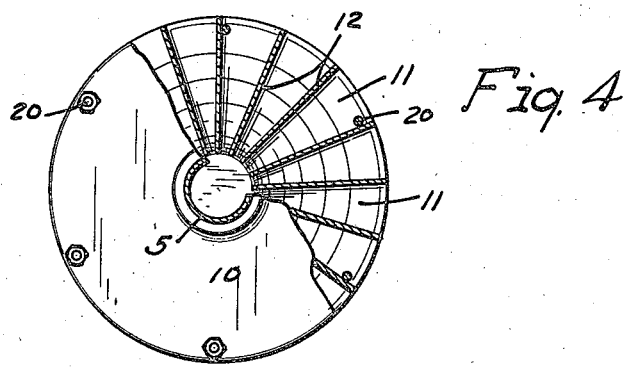
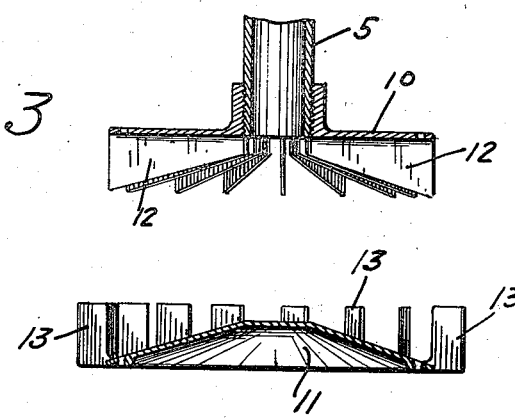
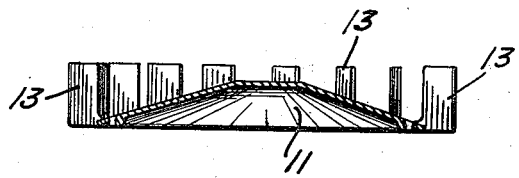
INVENTOR
John C. MacLachlan
BY HIS ATTORNEYS

UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

ROTARY SPRAYING HEAD.

1,420,722.  Specification of Letters Patent.  Patented June 27, 1922.

Application filed October 8, 1919. Serial No. 329,352.

*To all whom it may concern:*

Be it known that I, JOHN C. MacLACHLAN, a citizen of the United States, residing at St. Paul, in the county of Ramsey and State of Minnesota, have invented certain new and useful Improvements in Rotary Spraying Heads; and I do hereby declare the following to be a full, clear, and exact description of the invention, such as will enable others skilled in the art to which it appertains to make and use the same.

My present invention has for its object to provide an improved rotary spraying head especially adapted for reducing to powdered or granular form, milk, buttermilk, and various other liquids that have first been condensed or reduced to a heavy condition.

Two forms of the spraying head are illustrated in the accompanying drawings wherein like characters indicate like parts throughout the several views.

Referring to the drawings:

Fig. 1 is a view partly in elevation and partly in vertical section showing one of the spraying heads and means for supporting and rotating the same;

Fig. 2 is a horizontal section on the line 2—2 of Fig. 1, some parts being broken away and other parts being sectioned on the lower line;

Fig. 3 is a vertical axial section taken on the line 3—3 of Fig. 2, but showing the two sections of the spraying head vertically separated and some parts being broken away; and Fig. 4 is a view corresponding to Fig. 2, but illustrating a modified and somewhat simplified form of the spraying head.

Describing first the preferred form of the spraying head illustrated in Figs. 1, 2 and 3, the numeral 5 indicates a vertical rotary tube held against vertical movement but mounted to rotate in suitable bearings 6 and 7 supported, respectively, by a top plate 8 and bearing brackets 9 mounted on said top plate 8. Here it may be stated that the top plate 8, in practice, will constitute the top of a large drying and collecting chamber within the upper portion of which the spraying head is mounted to rotate on a vertical axis, to wit, on the axis of the spindle 5. The spraying head comprises a disk-like top plate 10 and a conical bottom plate 11, the said plates being connected in such manner that the vertical space between the same increased outwardly in all directions from the lower end of the tube 5. The top plate 10 has a hub that is rigidly secured to the lower end of a rotary tube 5 and the central portion of the bottom plate 11 immediately underlies the lower end of said tube. Extending from the lower end of the tube or tubular spindle 5 radially outward to the peripheries of the plates 10 and 11 are upright so-called spreader blades 12 and their upper and lower edges join, respectively, with the said plates 10 and 11, and hence, diverge radially outward in the vertical planes in which the blades radiate. Preferably, and as shown in Fig. 3, these spreader blades 12 are cast integral with and depending from the top plate 10.

Here attention is called to the fact that the construction of the sprayer head so far described is illustrated in Figs. 1, 2 and 3 and constitutes the complete sprayer head illustrated in Fig. 4. In the preferred form of the sprayer head, however, illustrated in Figs. 1, 2 and 3, in addition to the features already described, the sprayer head is provided with beater blades 13 located just outward of the respective blades 12, preferably and as shown, cast integral with and projecting outward and upward from the rim portion of the lower plate 11. The direction of rotation of the head is indicated by the arrow marked on Fig. 2, and it will be noted that the beater blades 13, circumferentially, are positioned between adjacent spreader blades 12 and are inclined backward and outward in respect to the direction of rotation. For rotating the tube or tubular spindle 5, said spindle is provided with a pulley 14 and a belt 15 is run over this pulley and over a larger pulley 16 carried by the beater shaft and a small electric motor 17, shown as supported from the top plate 8 by a bracket 18.

When it is desired to produce a quite fine dry powder from condensed milk or the like, the simpler form of spraying head shown in Fig. 4 will operate very satisfactorily. To attain this result, the milk, for example, need not be condensed to a heavy pasty form, but will be condensed only to such heavy form that it will flow quite freely, and when the milk thus condensed is fed from a suitable source into the upper end of the rotary spindle through a suitable tube 19, for example, it will flow freely down through the tubular spindle 5 and onto the raised central portion of the bottom plate 11, and, by the action of centrifugal force, will be thrown outward, by the so-called spreader blades 12, will be forced against the outflowing heavy milk and the latter will be caused to spread out in thin films against the said spreader blades, and as the films of flowing condensed milk move outward, they will cover the engaged surface of the spreader blades, will become thinner and vertically wider and wider until the said flowing films reach the outer edges of the spreader blades and will then be projected in very thin fine showers. When these fine thin showers of condensed milk are projected into the hot air of the precipitating and drying chamber, the fine particles will be quickly dried and will reach the bottom of the chamber in dry powdered form. In practice, it is advisable to rotate this sprayer head at very high speed, usually about 5000 revolutions per minute, and it is evident that under such high speed, the outer edges of the spreader blades 12 will cut the air under such friction that the films of condensed milk delivered therefrom will, by the friction of the air, be disintegrated and divided into very fine sprays.

The top and bottom plates 10 and 11 in their preferred construction, are rigidly but detachably connected by circumferentially spaced nut-equipped bolts 20 passed through the outer portions thereof, as best shown in Figs. 1 and 2.

It is frequently, and in fact, generally desirable to produce the finely divided dry milk or other food product in relatively coarse or granular form. This requires, in the first place, that the milk, or the like, be first condensed or reduced to a very heavy semi-fluid or pasty form, and moreover, the reduction of this heavy pasty form to granular form, requires a beating action. Hence, in the preferred form of the spraying head, the beater blades 13, or equivalent beating devices are provided.

In the operation of the spraying head illustrated in Figs. 1, 2 and 3, the operation, to a certain point, to a point of discharge of the films of condensed substance from the outer portions of the spreader blades 13 will be substantially as already described, but as the films are projected, they will be immediately struck and beaten to small particles by the beater blades 13 with the result that the heavy pasty substance is reduced to granular form, as stated. Moreover, it will be noted that the oblique beater blades 13 strike the outflowing particles discharged from the spreader blades 12, and while producing the beating action, retard the upward discharge and have a tendency toward an inward deflection, and this increases the beating and disintegrating action necessary to the proper production of the granular product.

What I claim is:

1. A rotary spraying head having in combination a plurality of radially extending spaced blades, said blades extending substantially normal to the axis of rotation and the longitudinal edges thereof diverging outwardly so as to reduce in thickness and increase in width the films of material carried over the surface of said blades, and disks enclosing said blades at the top and bottom thereof.

2. The structure set forth in claim 1, and vertical fixed blades carried by said head disposed radially outward of said first mentioned blades and opposite the spaces between said first mentioned blades.

3. The structure set forth in claim 2, said last mentioned blades having a rearward inclination in respect to the direction of rotation of said head.

4. The structure set forth in claim 1, a central vertical tube extending upward through the top disk, the inner edges of said radial blades terminating substantially at the circumference of said tube, said tube forming a feeding means for the material delivered to said head.

5. The combination with a rotary tubular spindle open in its lower end, of a sprayer head carried by the lower end of said spindle and comprising upper and lower plates connected together with the space between the same diverging outwardly from the axis of rotation, radial spreader blades increasing the vertical width in a direction outwardly from the direction of rotation, and beater blades carried by the outer portion of said head and arranged to intercept and beat the films of substance discharged from the outer ends of said spreader blades.

6. The combination with a rotary tubular spindle open in its lower end, of a sprayer head carried by the lower end of said spindle and comprising upper and lower plates connected together with the space between the same diverging outwardly from the axis of rotation, radial spreader blades increasing the vertical width in a direction outwardly from the direction of rotation, and beater blades carried by the outer portion of said head and arranged to intercept and beat the films of substance discharged from the outer ends of said spreader blades, the said beater blades having a backward and outward inclination in respect to the direction of rotation of the beater head.

7. The combination with a rotary tubular spindle open in its lower end, of a sprayer head carried by the lower end of said spindle and comprising upper and lower plates connected together with the space between the same diverging outwardly from the axis of rotation, radial spreader blades increasing the vertical width in a direction outwardly from the direction of rotation, and beater blades carried by the outer portion of said head and arranged to intercept and beat the films of substance discharged from the outer ends of said spreader blades, the said spreader blades being integral with one of the plates of said head and said beater blades being integral with the other plate of said head.

In testimony whereof I affix my signature.

JOHN C. MacLACHLAN.